March 5, 1935.　　　W. R. BARNEY　　　1,993,236
POWER TAKE-OFF
Filed Dec. 7, 1933
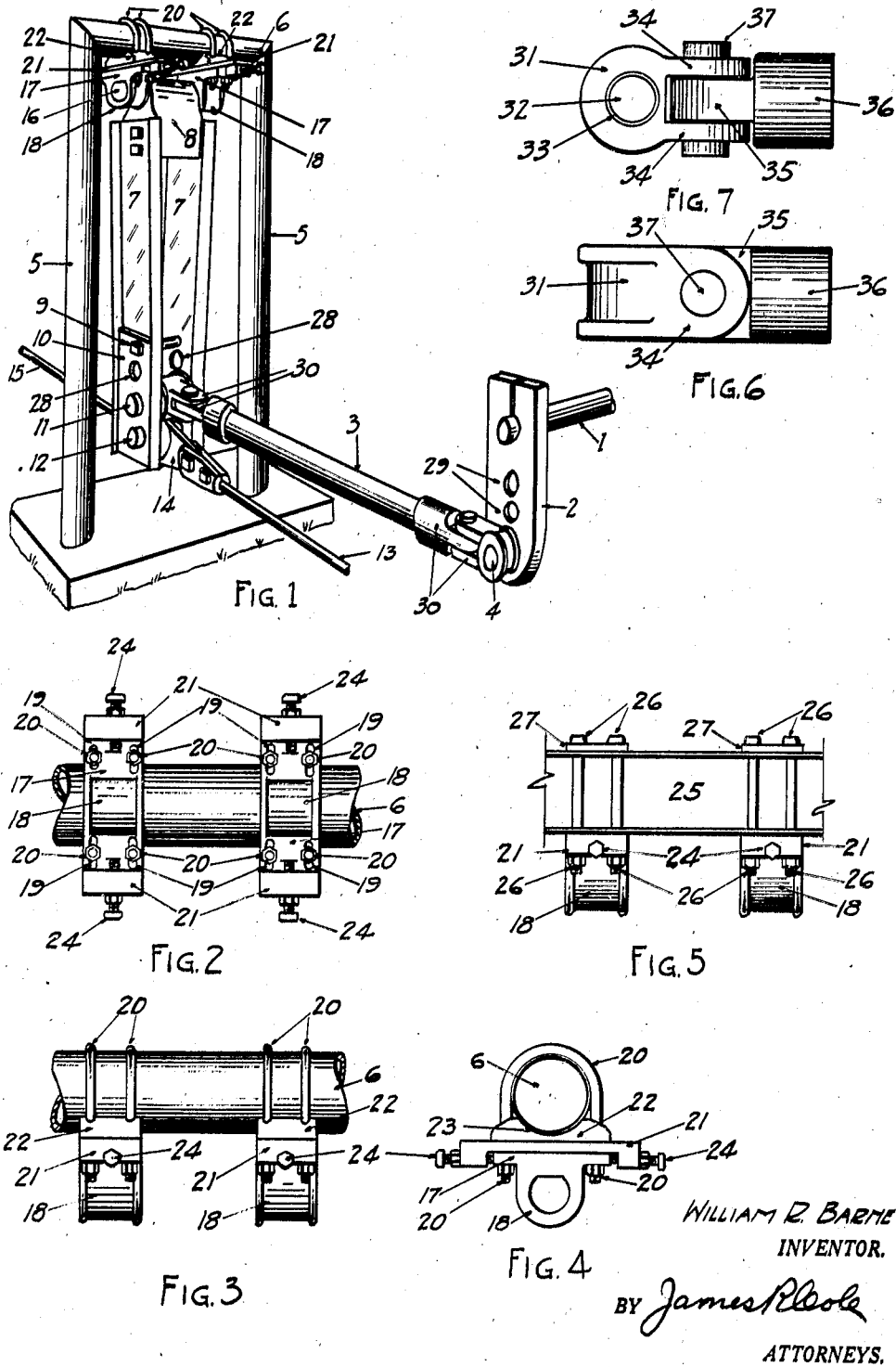
WILLIAM R. BARNEY
INVENTOR.
BY James R. Cole
ATTORNEYS.

Patented Mar. 5, 1935

1,993,236

UNITED STATES PATENT OFFICE 1,993,236

POWER TAKE-OFF

William R. Barney, Fort Worth, Tex., assignor to W. C. Norris, Tulsa, Oklahoma

Application December 7, 1933, Serial No. 701,305

11 Claims. (Cl. 74—42)

My invention relates to new and useful improvements in power takeoffs to rod lines for pumping wells, and has for its objects: to provide a takeoff from a horizontally disposed rotable power shaft either to a single rodline or to a plurality of rodlines located at the power below the horizon of said power shaft to the effect that said rodlines may takeoff from the power at the surface of the ground and be more easily installed and handled; to also provide a take-off simple in construction and wherein a pendulum lever is employed and in which a pitman actuates said lever, preferably altho not necessarily with the power point on said lever located intermediate of its fulcrum and weight bearing points, whereby less strain is placed upon the takeoff than with any other similar device; to provide an adjustable bearing plate or plates with an adjuster base for said lever with which the movement of the lever may be aligned with that of the pitman and rodlines or either of them; to provide a pipe adapter for said bearing plate structure whereby said structure may be attached either to a pipe or to an I beam; and to provide a flexible pitman connection whereby the takeoff lever need only be aligned with the rodline or rodlines and not with both rodline and pitman, which provision of itself simplifies the alignment of the power takeoff as a whole.

With the above and other objects in view which will be disclosed as the description proceeds, my invention consists in the novel features hereinafter set forth, shown in the accompanying drawing and more particularly pointed out in the appended claim.

Referring to the drawing in which like numerals designate similar parts throughout the several views:

Fig. 1 is a view in perspective of my preferred form of power takeoff in general connected to a plurality of opposed rodlines, with the takeoff lever fulcrumed on my bearing plates which are mounted on my adjuster bases and attached to a pipe support by means of my pipe adapters, and with the pitman provided with my flexible connections.

Fig. 2 is a bottom plan view of a set of my takeoff lever bearing plates and adjuster bases as attached to a pipe support.

Fig. 3 is a view in side elevation of the same.

Fig. 4 is a view in end elevation of the same.

Fig. 5 is a view in side elevation of a set of my takeoff lever bearing plates and their adjuster bases as attached to a structural steel I beam support.

Fig. 6 is a top plan view of my flexible pitman connection.

Fig. 7 is a view of the same in side elevation.

In the drawing, 1 represents a conventional horizontally mounted power shaft with a crank 2 thereon. 3 represents a pitman connected to said crank by wristpin 4. 5 represents a pair of upright pipe standards with a pipe header 6 thereon which serves as a support for my takeoff lever. The preferred form of mounting for my takeoff lever is on a header either of a pipe or of a structural steel beam supported by standards of pipe or beams, but my lever may be mounted on separate independent standards with a lever bearing block attached to each standard, as is evident from the construction of my preferred form of takeoff lever bearing. The takeoff lever comprises a pair of channel irons 7 bolted together at one end to a pivot bearing block 8 and held together at the other end by a bolt 9 passed thru said channels and thru the strengthening plates 10 thereon, and also held together by a pitman pin 11 and a rodline connecting pin 12, which pins extend thru and are held in said channels 7 and plates 10. Pitman 3 is operatively connected to said takeoff lever thru pitman pin 11. Rodline 13, which runs to one of the wells to be pumped thru my power takeoff, is connected to said takeoff lever thru a pullrod connection 14 which is pivoted on rodline pin 12. Rodline 15, which runs to another of the wells to be pumped thru my power takeoff, is also connected to said takeoff lever thru said pullrod connection 14 to which it is attached opposite the connection to rodline 13. As is readily apparent, the loads of rodlines 13 and 15 when both rodlines are in operation, are opposed and tend to counterbalance each other, and that the takeoff may however be used to operate either one of the rodlines, and that additional rodlines might also be connected to the takeoff lever.

My takeoff lever is attached to pipe header 6 by a fulcrum pin 16 passed thru pivot bearing block 8, which is a part of the aforesaid lever.

While I have shown a preferred form of takeoff lever wherein the power point is between the fulcrum and the weight bearing point, it is to be understood that my takeoff lever is of any type wherein the lever is fulcrumed at the top and is free to swing as a pendulum on its fulcrum with its power bearing point and its weight bearing point at or towards the free end of the lever. Obviously the weight bearing point of the lever may coincide with its power bearing point or the weight bearing point may be located between the fulcrum and the power bearing point, without departing from the invention.

My adjustable bearing plate is represented by numeral 17 and has a pillow block 18 wherein said fulcrum pin 16 may be held. In said bearing plate and positioned transverse of said pillow block, are bolt slots 19 thru which U bolts 20 may be run to secure said bearing plate 17 to an adjuster base 21, which adjuster base is provided with bolt holes positioned to correspond with bolt slots 19 and thru which bolt holes U bolts 20 may also be passed.

22 represents my pipe adapter which is also provided with bolt holes positioned to correspond with bolt slots 19 in the adjustable bearing plate 17 and with the aforesaid bolt holes in the adjuster base 21. Pipe adapter 22 is provided with a curved surface 23 to grip header 6.

On said adjuster base 21 are two set screws 24, positioned opposed to each other and lying in a direction parallel to slots 19 located in bearing plate 17 and also positioned to bear on said bearing plate in manner adapted to move it transversely of the normal axis of fulcrum pin 16 and to hold said fulcrum pin in axial alignment at right angles to the plane prescribed by the normal movement of the takeoff lever when said takeoff is in operation. It is obvious that instead of fulcrum pin 16 being held in my bearing plates 17 and the takeoff lever pivoted on said pin, the pin could be rigidly held in the lever and the ends of the pin provide gudgeons which might be pivotally mounted in said lever plates, and the same result effected as with the structure mentioned.

Fig. 5 shows a set of my adjustable bearing plates 17 and adjuster bases 21 attached to an I beam 25 in place of a pipe header 6, in which case the adjuster base 21 abuts beam header 25 without the use of pipe adapter 22, and instead of U bolts 20 being used, straight bolts 26 are used with which to clamp the device to I beam 25 thru a clamp plate 27 on top of said header. The pair of adjuster bases 21 may also be mounted on separate standards instead of on a header supported by standards as shown in the drawing.

30 represents generally my flexible pitman connection, in detail of which is more clearly shown in Figs. 6 and 7, and in which 31 represents a pitman block or head having a hole 32 therethru with bearing bushing 33 therein, whereby pitman head 31 may be mounted on wrist pin 4 or on pitman pin 11 as the case may be, and with said pitman head 31 having a bifurcated extension 34 extending parallel with the axis of said hole 32 and adapted to receive the flat bar or tongue 35 projecting from a stud 36 which may be attached to a pipe pitman 3 in Fig. 1, either by threaded connection or by welding, and with tongue 35 pivotally held in said bifurcation by pin 37 passed thru said extension 34 and said tongue 35, and by the broad flat surfaces of the contacting faces of said tongue 35 with said extension 34.

The axial alignment of pin 37 with bearing hole 32 being at right angles to each other, the pitman is permitted to flex sidewise only and not in any other plane.

In operation, with the takeoff mounted and connected to the power and rodlines as shown in Fig. 1 of the drawing, when the power shaft is rotated the rodlines 13 and 15 are reciprocated and, when both are connected to the power and to their respective loads, their loads tend to counterbalance each other. The rodlines lay close to the ground. The length of their stroke may be increased or diminished by connecting the pitman 3 into the alternative holes 28 in the takeoff lever or into the alternative holes 29 in the crank.

While perfect alignment of the takeoff would require that the movements of the pitman, the takeoff lever, and the rodlines, all lay in the same plane, this can hardly be done in practice without means of adjusting the axial alignment of the fulcrum pin 16 as heretofore indicated, and in order to align the takeoff lever to work in the same plane as the aforesaid pitman and rodlines the clamp bolts holding the bearing structure are first loosened and then the whole structure moved bodily along said support until the arcuate movement of the lever when in operation centers in said plane after which the set screws 24 are used to align the fulcrum pin 16 so that the complete movement of the takeoff lever will remain in said plane. Shims of course may be used between the adjuster base 21 and the I beam support 25, or between the adjuster base 21 and the pipe adapter 22 as the case may be, or may otherwise be used to assist in effecting said alignment. It is obvious that the pair of bearing plates used as shown in the drawing may be made integral of each other, that the pair of adjuster bases may also be made integral of each other, and that the pair of pipe adapters may likewise be made integral of each other, without departing from the spirit of my invention. But the single plates for use in pairs is preferred for reasons previously stated.

As the practice of installing rodline powers of this character is comparatively crude and close alignment of related working parts hard to achieve, I have provided, in my power takeoff as a whole, two flexible pitman connections to my takeoff lever which facilitate the installation of the takeoff and render it unnecessary to hold a close related alignment between pitman, takeoff lever and rodlines. When my flexible pitman connections are used, the takeoff lever need only be aligned with the rodline or rodlines instead of with both pitman and rodlines as previously explained, as my flexible pitman connections overcome any side thrust on the pitman which might be caused by a reasonable degree of misalignment.

Having thus fully disclosed my invention, what I claim and desire to secure by Letters Patent is:

1. In a power takeoff for transmitting power from a horizontally mounted power shaft to a plurality of rodlines located at said power takeoff below the horizon of said power shaft, a pitman operatively connected with said power shaft, a take off lever operatively connected with said pitman at a point intermediate of the fulcrum point and the weight bearing point of said lever and with said lever mounted in an upright position with its fulcrum uppermost and with said lever adapted to be actuated with an arcuate movement by said pitman, and means on said takeoff lever of connecting a plurality of rodlines the loads of which oppose each other.

2. In a power takeoff as claimed in claim one, means of pivotally adjusting the alignment of the fulcrum of said lever with reference to the plane prescribed by the movement of said pitman and the movement of said rodlines, to the effect that the plane prescribed by the movement of said takeoff lever may coincide with said first named plane.

3. In a power takeoff having a takeoff lever of the kind herein described, a fulcrum bearing plate for said lever, and means of adjusting said bearing plate pivotally with reference to the plane prescribed by the normal movement of said lever.

4. In a power takeoff having a takeoff lever of the kind herein described, an adjustable bearing plate, a fulcrum pin held thereon, an adjuster base for said bearing plate, and means on said adjuster base for adjusting the axial alignment of said fulcrum pin.

5. In a power takeoff having a takeoff lever of the kind herein described, an adjustable fulcrum bearing plate for said lever, a fulcrum pin held thereon and whereon said lever is mounted, and means of angular adjustment of said fulcrum pin with reference to the plane normally prescribed by the movement of said lever.

6. In a power takeoff having a takeoff lever of the kind herein described, an adjustable bearing plate having a pillow block thereon, bolt slots in said bearing plate and positioned therein transversely of said pillow block, an adjuster base for said bearing plate, bolt holes in said adjuster base and positioned therein to correspond with said bolt slots in said bearing plate, and a pair of set screws positioned opposed to each other and mounted on said adjuster base in manner adapted to bear upon said bearing plate in a direction parallel to said slots therein.

7. In a power takeoff having a takeoff lever of the kind herein described, an adjustable fulcrum bearing structure for said lever comprising a bearing plate, an adjuster base whereon the base surface thereof is flat and adapted to abut a flat surface on an I beam support to which said adjuster base may be secured, means on said adjuster base for adjusting said bearing plate thereon, a pipe adapter, and means of securing said bearing plate, adjuster base and pipe adapter to a pipe support.

8. In a power takeoff for transmitting power from a horizontally mounted power shaft to a rodline located at said power takeoff below the horizon of said shaft; a pitman adapted to be operatively connected with the source of power, a takeoff lever mounted in an upright position with its fulcrum uppermost and with said lever operatively connected with said pitman and adapted to be actuated by it with an arcuate movement, and means of connecting a rodline to said takeoff lever in manner adapted to cause said rodline to be reciprocated by it.

9. In a power takeoff as claimed in claim 8; means of pivotally adjusting the alignment of said lever with relation to the plane prescribed by its normal movement.

10. In a power takeoff as claimed in claim 8; a pitman as aforesaid and a flexible connection in said pitman.

11. In a power takeoff as claimed in claim 8; flexible connections in said pitman comprising a pitman head positioned on either end of said pitman with a pin bearing in said head and a pivoted coupling in said pitman wherein the axis of the pivot of said coupling lays at a right angle to the axis of the pin bearing in said pitman head.

WILLIAM R. BARNEY.